US012684209B2

(12) United States Patent (10) Patent No.: US 12,684,209 B2
Lee et al. (45) Date of Patent: Jul. 14, 2026

(54) FOLDED MODULE AND CAMERA MODULE INCLUDING THE SAME

(71) Applicant: SAMSUNG ELECTRO-MECHANICS CO., LTD., Suwon-si (KR)

(72) Inventors: Hong Joo Lee, Suwon-si (KR); Young Hwan Kwon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 45 days.

(21) Appl. No.: 18/962,960

(22) Filed: Nov. 27, 2024

(65) Prior Publication Data

US 2025/0247591 A1 Jul. 31, 2025

(30) Foreign Application Priority Data

Jan. 26, 2024 (KR) ........................ 10-2024-0012394

(51) Int. Cl.
*H04N 23/51* (2023.01)
*H04N 23/54* (2023.01)
*H04N 23/55* (2023.01)
(52) U.S. Cl.
CPC ............. *H04N 23/51* (2023.01); *H04N 23/54* (2023.01); *H04N 23/55* (2023.01)
(58) Field of Classification Search
None
See application file for complete search history.

(56) References Cited

U.S. PATENT DOCUMENTS

2022/0210299 A1 6/2022 Kwon et al.
2022/0279093 A1 9/2022 Kwon et al.

2022/0350108 A1 11/2022 Shin et al.
2023/0185053 A1* 6/2023 Kim ..................... G02B 7/1821
359/555
2023/0288677 A1 9/2023 Lee

FOREIGN PATENT DOCUMENTS

KR 10-2021-0077656 A 6/2021
KR 10-2022-0094087 A 7/2022
KR 10-2022-0148086 A 11/2022
KR 10-2023-0089524 A 6/2023
KR 10-2023-0101784 A 7/2023
KR 10-2023-0133419 A 9/2023

OTHER PUBLICATIONS

Korean Office Action Issued on Aug. 30, 2025, in Counterpart Korean Patent Application No. 10-2024-0012394 (9 Pages in English, 7 Pages in Korean).

* cited by examiner

*Primary Examiner* — Mark T Monk
(74) *Attorney, Agent, or Firm* — NSIP Law

(57) ABSTRACT

A folded module includes a housing; a rotation holder supported, together with a reflection member, on the housing to be rotatable about a first axis; a first ball group, disposed between the housing and the rotation holder, comprising one rotation axis ball forming the first axis and two guide balls spaced apart from the rotation axis ball; and a first driving unit, comprising a first driving magnet and a first driving coil, configured to generate a driving force to rotate the rotation holder about the first axis. The first driving magnet and the first driving coil are disposed in a space between the rotation axis ball and the two guide balls to be closer to the two guide balls than the rotation axis ball.

17 Claims, 14 Drawing Sheets

FOLDED MODULE AND CAMERA MODULE INCLUDING THE SAME

CROSS-REFERENCE TO RELATED APPLICATIONS

This application claims the benefit under 35 USC 119(a) of Korean Patent Application No. 10-2024-0012394 filed on Jan. 26, 2024, in the Korean Intellectual Property Office, the entire disclosure of which is incorporated herein by reference for all purposes.

BACKGROUND

1. Field

The present disclosure relates to a folded module and a camera module including the same.

2. Description of the Background

A camera module disposed in a mobile device may be manufactured to have performance comparable to that of a conventional camera. For example, the mobile device may employ a camera module added with all functions, such as an autofocus (AF) function, an optical image stabilization (OIS) function, or a zoom function.

Camera modules in a mobile device may use a reflector to change incident light path to achieve a desired overall length (or total track length). This folded structure may increase the optical path without increasing or reducing the overall length of the camera module, thereby enabling high zoom magnification.

A camera module, including the reflector, may rotate the reflector during its optical image stabilization. However, a part providing the reflector with a driving force and supporting an operation of the reflector may be disposed together around the reflector having a relatively small size, thus making it difficult to secure a sufficient driving force.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a folded module includes a housing; a rotation holder supported, together with a reflection member, on the housing to be rotatable about a first axis; a first ball group, disposed between the housing and the rotation holder, comprising one rotation axis ball forming the first axis and two guide balls spaced apart from the rotation axis ball; and a first driving unit, comprising a first driving magnet and a first driving coil, configured to generate a driving force to rotate the rotation holder about the first axis. The first driving magnet and the first driving coil are disposed in a space between the rotation axis ball and the two guide balls to be closer to the two guide balls than the rotation axis ball.

The first driving coil may include a first coil and a second coil that face the first driving magnet.

The first driving magnet may include a first magnet facing the first coil, and including two polarity regions on a surface that faces the first coil, and a second magnet facing the second coil, and including three polarity regions on a surface that faces the second coil.

The first driving unit may further include a first position sensor facing the second magnet.

The first driving magnet, including a third magnet facing the first coil and the second coil, may include four polarity regions on a surface that faces the first coil and the second coil.

The third magnet may include a first polarity region, a second polarity region, a third polarity region, and a fourth polarity region sequentially disposed in a length direction of the third magnet. The first coil may face the first polarity region and the second polarity region, and the second coil may face the third polarity region and the fourth polarity region.

The first driving unit may further include a first position sensor facing a third magnet, and the first position sensor may be disposed between the first coil and the second coil.

The first driving magnet may be disposed on the rotation holder, and the first driving coil may be disposed on the housing and faces the first driving magnet. The folded module may further include a first yoke facing the first driving magnet while having the first driving coil interposed therebetween and generating magnetic attraction with the first driving magnet.

The folded module may further include a reflection holder mounted with the reflection member, and supported on the rotation holder to be rotatable about a second axis perpendicular to the first axis; a second ball group, disposed between the rotation holder and the reflection holder, forming the second axis; and a second driving unit, including a second driving magnet and a second driving coil, configured to generate a driving force to rotate the reflection holder about the second axis.

The second driving magnet may be disposed on the reflection holder, and the second driving coil, disposed on the housing, may face the second driving magnet.

The folded module may further include a first magnetic material disposed on the reflection holder; and a second magnetic material, disposed on the rotation holder, facing the first magnetic material. The first magnetic material and the second magnetic material may generate magnetic attraction therebetween.

In another general aspect, a camera module includes a housing; one or more lens modules, disposed in the housing, including at least one lens; and a folded module disposed in the housing. The folded module includes a rotation holder supported, together with a reflection member configured to convert an incident light path, on the housing to be rotatable about a first axis; a first ball group, disposed between the housing and the rotation holder, including one rotation axis ball forming the first axis and two guide balls spaced apart from the rotation axis ball; and a first driving unit, including a first driving magnet, a first driving coil, and a first position sensor, the first driving unit configured to generate a driving force to rotate the rotation holder about the first axis. The first driving magnet includes a magnet including three or more polarity regions and two or more neutral regions, respectively disposed between the polarity regions, and a subset of the two or more neutral regions in the magnet face the first driving coil, and a remainder of the two or more neutral regions face the first position sensor.

3

The first driving magnet may include a first magnet including two polarity regions on a surface that faces the first driving coil, and a second magnet including three polarity regions on a surface that faces the first driving coil. The first driving coil may include a first coil facing the first magnet and a second coil facing the second magnet.

The first driving magnet may include a third magnet including four polarity regions on a surface that faces the first driving coil, and the first driving coil may include a first coil and a second coil facing different polarity regions among the four polarity regions of the third magnet.

The first position sensor may be disposed between the first coil and the second coil.

The folded module may further include a reflection holder mounted with the reflection member, and supported on the rotation holder to be rotatable about a second axis perpendicular to the first axis; a second ball group, disposed between the rotation holder and the reflection holder, forming the second axis; and a second driving unit, including a second driving magnet and a second driving coil, configured to generae a driving force to rotate the reflection holder about the second axis.

The lens module may include a first lens module disposed in front of the folded module based on an incident light path, and a second lens module disposed behind the folded module based on an incident light path.

Other features and aspects will be apparent from the following detailed description, the drawings, and the claims.

Figure 1:
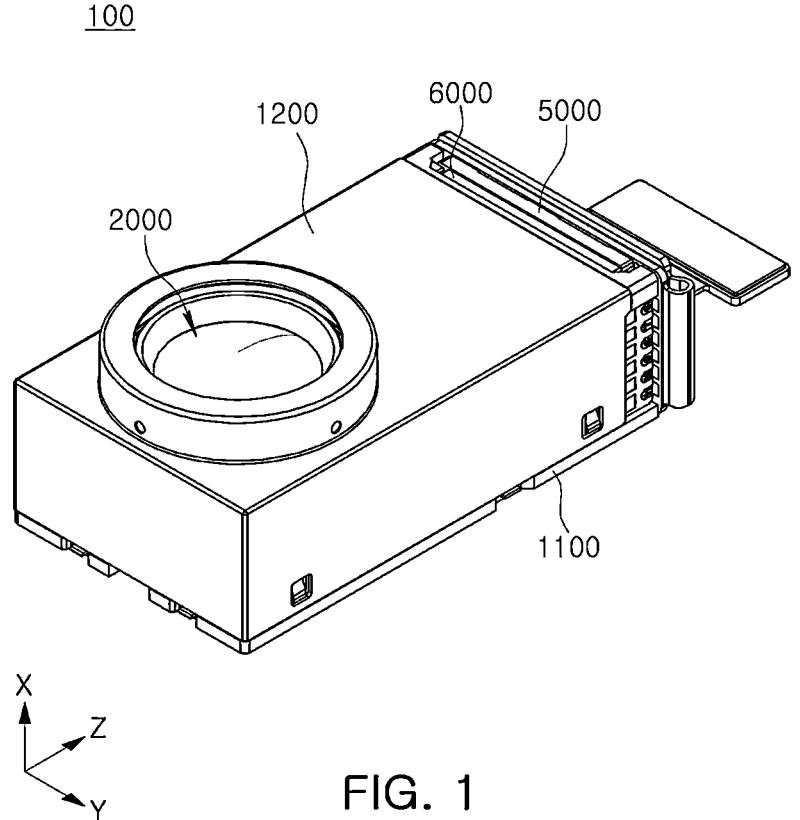
FIG. 1 is a perspective view of a camera module according to an embodiment of the present disclosure.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

4

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

In the specification, a first axis or first axis direction may refer to an X-axis or X-axis direction in the drawings, a second axis or second axis direction may refer to an Y-axis or Y-axis direction in the drawings, and an optical axis (third axis) or optical axis direction (third axis direction) may refer to a Z-axis or Z-axis direction in the drawings. In addition, the first axis may be perpendicular to the optical axis, and the second axis may be perpendicular to both the optical axis and the first axis.

One or more embodiments of the present disclosure discloses a folded module having increased driving force during optical image stabilization, increased yaw rotation driving force, and a camera module including the same.

FIG. 1 is a perspective view of a camera module 100 according to an embodiment of the present disclosure.

The camera module 100, according to an embodiment of the present disclosure, may convert a path of light incident on the camera module 100 at least once.

The camera module 100, according to an embodiment of the present disclosure, may have a relatively long overall length.

Figure 2:
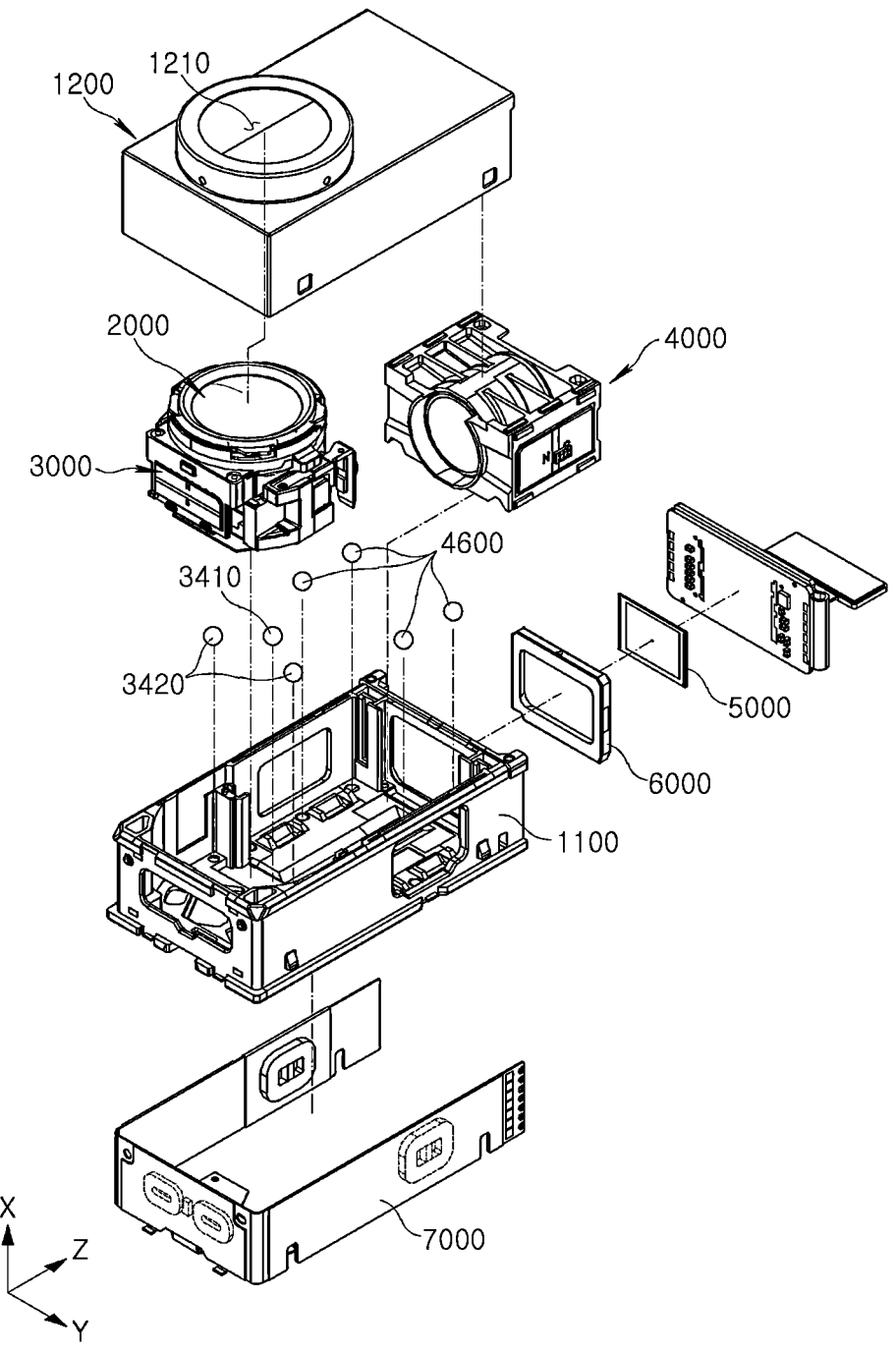
FIG. 2 is an exploded perspective view of the camera module according to an embodiment of the present disclosure.

FIG. 2 is an exploded perspective view of the camera module 100, according to an embodiment of the present disclosure.

According to an embodiment of the present disclosure, the camera module 100 may include a housing 1100, a case 1200, a first lens module 2000, a folded module 3000, a second lens module 4000, an image sensor 5000, a filter unit 6000, and a circuit board 7000. However, the camera module 100 may selectively omit the first lens module 2000.

The housing 1100 may be a box-shaped member with an open top and internal space.

Either one or both of the folded module 3000 and the second lens module 4000 may be accommodated in the internal space of the housing 1100. In an embodiment, the folded module 3000 and the second lens module 4000 may be accommodated together in the internal space of the housing 1100. Alternatively, the folded module 3000 and the second lens module 4000 may be accommodated in different housings 1100. That is, the housings 1100 may individually accommodate the folded module 3000 and the second lens module 4000.

The first lens module 2000 may be disposed outside the housing 1100. In an embodiment, the first lens module 2000 may be disposed on an open top of the housing 1100.

The case 1200, the image sensor 5000, the filter unit 6000, and the circuit board 7000 may be coupled to the outside of the housing 1100.

The image sensor 5000 and the filter unit 6000 may be coupled to one surface of the housing 1100 in a length direction.

The circuit board 7000 may be coupled to the other surfaces of the housing 1100, except for the surface to which the image sensor 5000 and the filter unit 6000 are coupled, and coupled to a portion of a bottom surface of the housing 1100.

The case 1200 may be coupled to the housing 1100 and cover the open top of the housing 1100 and the other surfaces of the housing 1100, except for the surface to which the image sensor 5000 and the filter unit 6000 are coupled and the bottom surface of the housing 1100. The internal space of the housing 1100 may be separated from an exterior of the camera module 100 by the case 1200 coupled thereto.

The case 1200 may include an opening 1210, and a portion of the first lens module 2000 may be disposed in the opening 1210.

Figure 3:
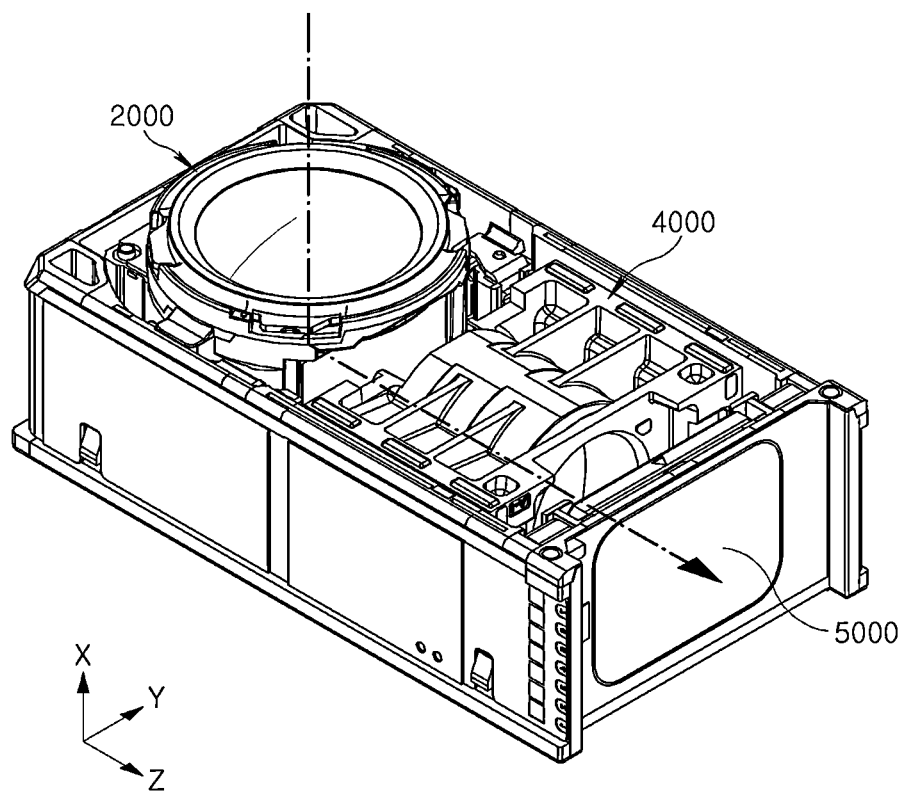
FIG. 3 is a view showing an arrangement relationship of a first lens module, a folded module, and a second lens module according to an embodiment of the present disclosure.

FIG. 3 shows an arrangement relationship of a first lens module 2000, a folded module 3000, and a second lens module 4000 according to an embodiment of the present disclosure.

According to an embodiment of the present disclosure, the first lens module 2000, the folded module 3000, and the second lens module 4000 may be sequentially arranged on the path of light incident on the camera module 100.

The folded module 3000 may be disposed between the first lens module 2000 and the second lens module 4000 to change the incident light path. In an embodiment, the folded module 3000 may change the progression path of incident light in the first axis direction (X-axis direction) based on the drawing to the optical axis direction (Z-axis direction).

The first lens module 2000 and the folded module 3000 may be disposed in the first axis direction (X-axis direction), and the folded module 3000 and the second lens module 4000 may be disposed in the optical axis direction (Z-axis direction).

The image sensor 5000 may be disposed behind the second lens module 4000.

Light emitted from the second lens module 4000 may be incident on the image sensor 5000. In an embodiment, light emitted from the second lens module 4000 may pass through the filter unit 6000 to be incident on the image sensor 5000.

The housing 1100 may include an opening 1151 on one surface on which the filter unit 6000 and the image sensor 5000 are coupled. Therefore, light emitted from the second lens module 4000 may be incident from the outside of the housing 1100 to the filter unit 6000 and the image sensor 5000 coupled to one surface of the housing 1100 in the length direction.

The image sensor 5000 may generate an electrical signal corresponding to light incident on the image sensor 5000.

Figure 4:
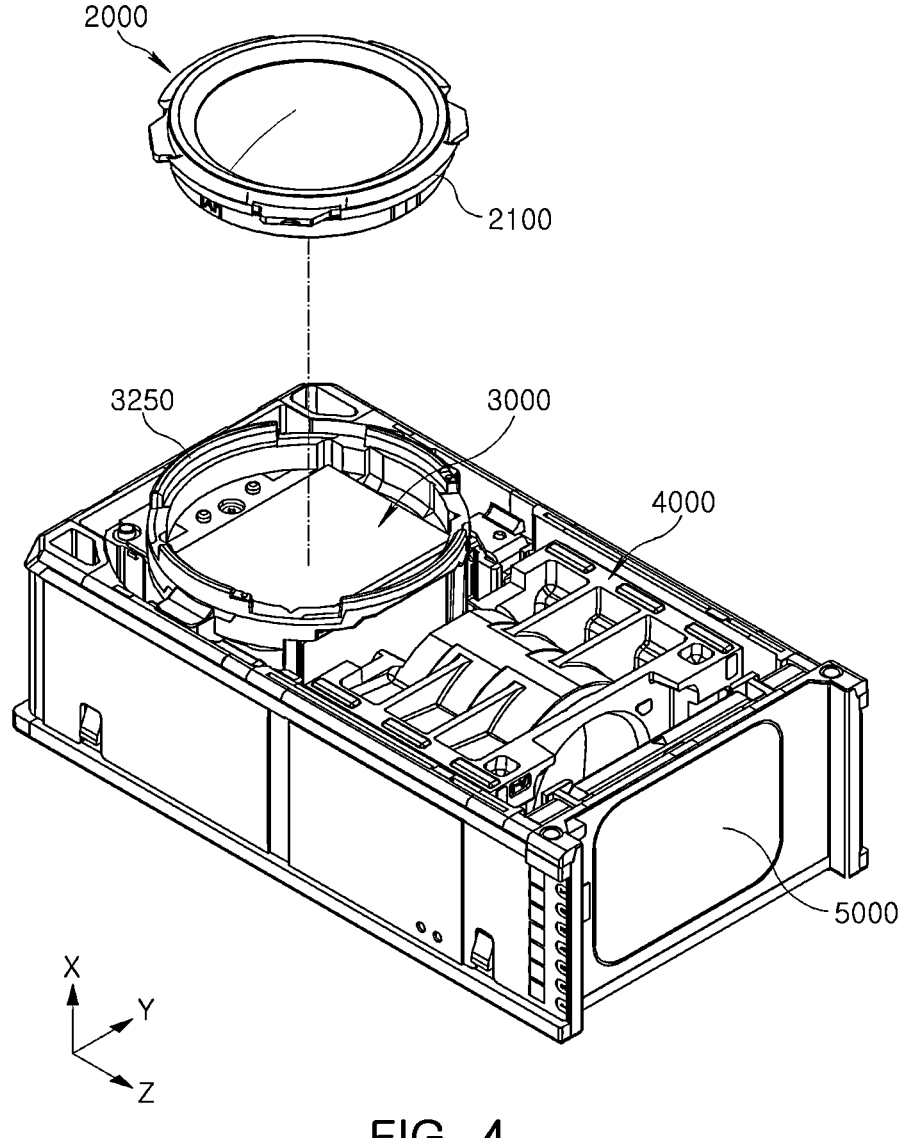
FIG. 4 is an exploded perspective view of the first lens module according to an embodiment of the present disclosure.

FIG. 4 is an exploded perspective view of the first lens module 2000 according to an embodiment of the present disclosure.

According to an embodiment of the present disclosure, the first lens module 2000 may include a first lens barrel 2100.

The first lens barrel 2100 may have one or more lenses disposed thereon in the first axis direction (X-axis direction).

The first lens barrel 2100 may be disposed in the opening 1210 of the case 1200, and externally exposed from the camera module 100. Therefore, light reflected from an external subject may be incident on the first lens module 2000.

The first lens barrel 2100 may be seated on and coupled to the top of the folded module 3000. In an embodiment, the folded module 3000 may include a rotation holder 3200 on which a reflection member 3100 is seated, and a seating part 3250, on which the first lens barrel 2100 is seated, disposed on the top of the rotation holder 3200.

The seating part 3250 may be formed in the shape of a guide protrusion guiding a seating position of the first lens barrel 2100, and the first lens barrel 2100 may be aligned by the guide protrusion to be seated on and coupled to the seating part 3250. For example, the first lens barrel 2100 may be seated and coupled to the top of the folded module 3000 for the reflection member 3100 and the optical axis to be aligned by the guide protrusion.

A spacer (not shown) may be further disposed between the first lens barrel 2100 and a seating part 3250.

The spacer may include an opening through which light incident from the first lens barrel 2100 passes and a light blocking part blocking a portion of light incident from the first lens barrel 2100. The light blocking part may be disposed in a surrounding region of the opening.

According to the above-described structure, the first lens module 2000 may be coupled to the folded module 3000 and rotated about the first axis (X-axis) and the second axis (Y-axis) together with the folded module 3000.

Figure 5:
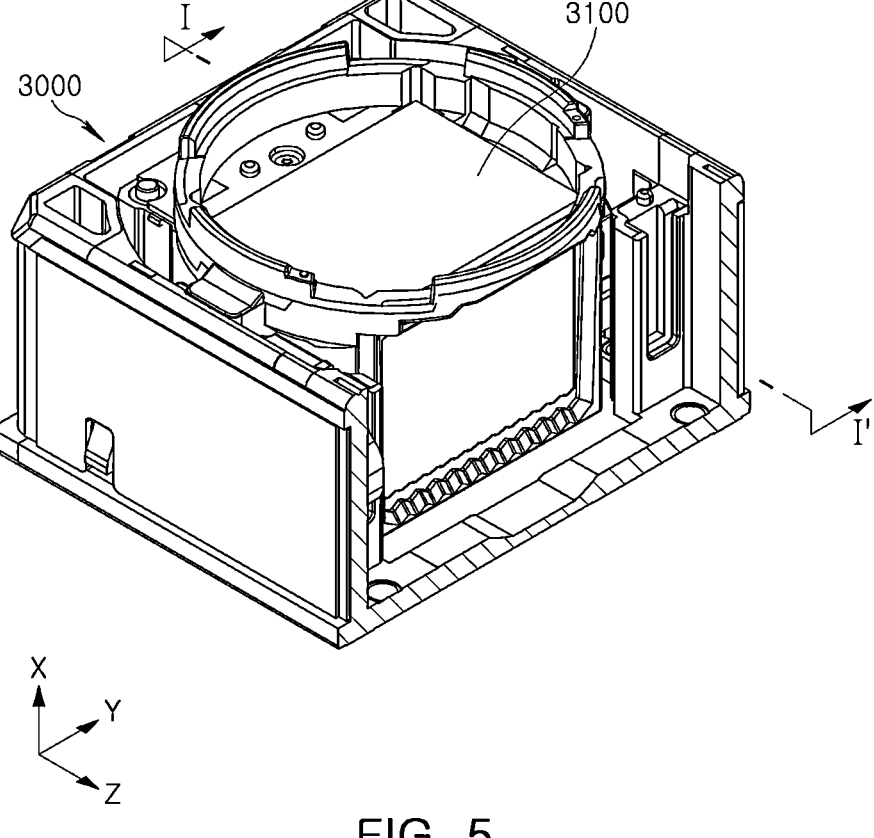
FIG. 5 is a perspective view of the folded module according to an embodiment of the present disclosure.

FIG. 5 is a perspective view of the folded module 3000 according to an embodiment of the present disclosure.

According to an embodiment of the present disclosure, the folded module 3000 may be disposed below the first lens module 2000 in the first axis direction (X-axis direction).

The folded module 3000 may include the reflection member 3100 converting the path of light incident on the camera module 100. The reflection member 3100 may convert the progression path of light incident in approximately the first axis direction (X-axis direction) to approximately the optical axis direction (Z-axis direction).

In an embodiment, the reflection member 3100 may be a prism that includes an incident surface, a reflection surface, and an emission surface. The prism may have the incident surface facing the first lens module 2000 and the exit surface facing the second lens module 4000.

The camera module 100, according to an embodiment of the present disclosure, may correct an unstable image occurring during image capture by rotating the folded module 3000.

The folded module 3000 may be rotated relative to the housing 1100, accommodating the folded module 3000. The folded module 3000 may be rotated relative to the housing 1100 by using the first axis (X-axis) and the second axis (Y-axis) as its rotation axis.

Hereinafter, the description describes components of the folded module 3000 according to an embodiment of the present disclosure in detail with reference to FIGS. 6 and 7.

Figure 6:
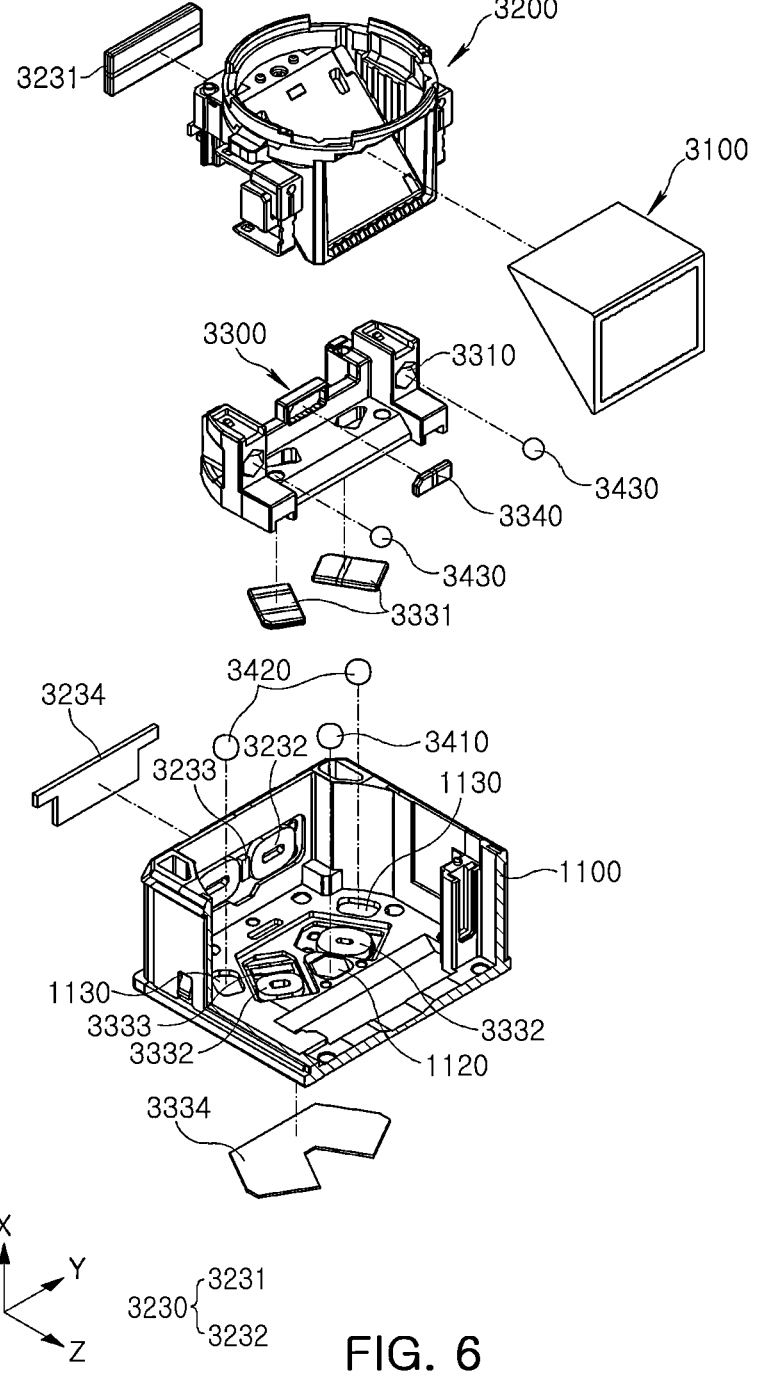
FIG. 6 is an exploded perspective view of the folded module, including a housing, according to an embodiment of the present disclosure.
Figure 7:
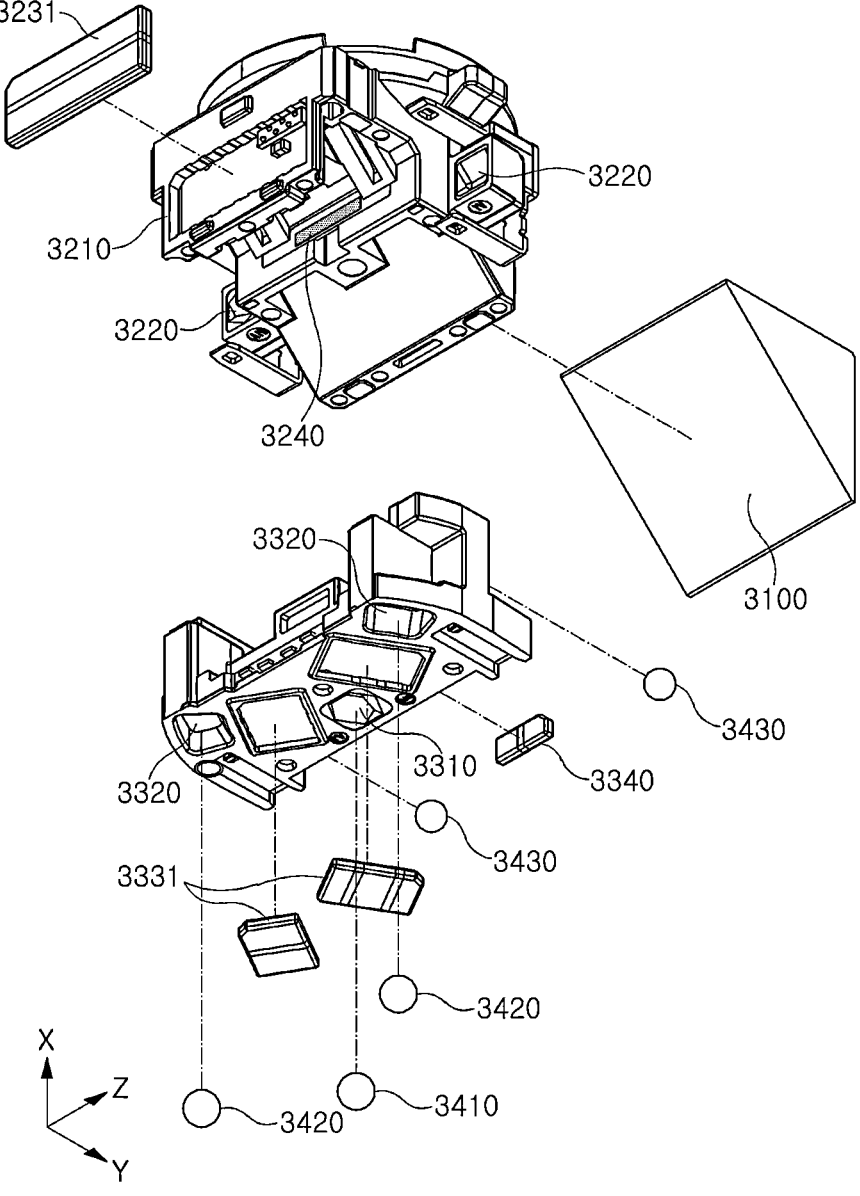
FIG. 7 is an exploded perspective view of the folded module viewed from a different angle than FIG. 6.

FIG. 6 is an exploded perspective view of the folded module, including the housing, according to an embodiment of the present disclosure; and FIG. 7 is an exploded perspective view of the folded module viewed from a different angle than FIG. 6.

According to an embodiment of the present disclosure, the folded module 3000 may include the reflection member

3100, a reflection holder 3200, and a rotation holder 3300. In addition, the housing 1100 may also be a component of the folded module 3000.

In an embodiment, the reflection member 3100 may be the prism as described above, and may convert the progression of incident light to approximately the optical axis direction (Z-axis direction). The reflection member 3100 may be mounted on the reflection holder 3200.

The reflection holder 3200 may be rotatably supported by the rotation holder 3300. In an embodiment, the reflective holder 3200 may be rotated (pitched) relative to the rotation holder 3300 by using the second axis (Y-axis) as its rotation axis while being supported on the rotation holder 3300.

The rotation holder 3300 may be rotatably supported by the housing 1100. In an embodiment, the rotation holder 3300 may be rotated (yawed) relative to the housing 1100 by using the first axis (X-axis) as its rotation axis while being supported by the housing 1100.

The reflection member 3100 may be mounted on the reflection holder 3200 and rotated together with the reflection holder 3200 using the second axis (Y-axis) as its rotation axis. In addition, the reflection member 3100 and the reflection holder 3200 may be rotated together with the rotation holder 3300 by using the first axis (X-axis) as its rotation axis.

That is, the reflection member 3100 may be rotated by using the first axis (X-axis) and the second axis (Y-axis) as its rotation axis, and an optical image stabilization function of the camera module 100 may be implemented by the rotation of the reflection member 3100.

The folded module 3000 may include a first driving unit 3330 generating driving force to rotate the rotation holder 3300 about the first axis (X-axis).

The first driving unit 3330 may be a voice coil motor, including a first driving magnet 3331 and a first driving coil 3332.

The first driving unit 3330 may be separately disposed in the rotation holder 3300 and the housing 1100. For example, the first driving magnet 3331 may be disposed on a bottom surface of the rotation holder 3300, and the first driving coil 3332 may be disposed in the housing 1100 and face the first driving magnet 3331. In an embodiment, the first driving coil 3332 may be mounted on the circuit board 7000 and disposed in the housing 1100.

The first driving magnet 3331 and the first driving coil 3332 may face each other in the first axis direction (X-axis direction).

According to an embodiment of the present disclosure, at least one first driving magnet 3331 may be provided. The first driving magnet 3331 may have a surface facing the first driving coil 3332 and magnetized into a north (N) pole (or a south(S) pole), a neutral region, and the S pole (or the N pole) in approximately the rotation direction of the rotation holder 3300. However, this configuration is only an embodiment, and its details are to be described below.

The first driving coil 3332 may include a plurality of coils facing the first driving magnet 3331. In an embodiment, the first driving coil 3332 may include two coils. According to the embodiments of the present disclosure, the first driving unit 3330 may include two coils, thus increasing the driving force for rotating the rotation holder 3300 about the first axis (X-axis).

The first driving magnet 3331 and the first driving coil 3332 may generate the driving force for rotating the rotation holder 3300 about the first axis (X-axis) by an electromagnetic interaction.

The first driving unit 3330 may include a first position sensor 3333. The first position sensor 3333 may detect a position of the first driving magnet 3331. One or more first position sensors 3333 may be provided.

The first position sensor 3333 may be mounted on the circuit board 7000 together with the first driving coil 3332, and disposed in the housing 1100. The first position sensor 3333 may face the neutral region of the first driving magnet 3331 when the folded module 3000 is in its neutral position.

The first position sensor 3333 may be a magnetic sensor. For example, the first position sensor 3333 may be a Hall sensor.

A first yoke 3334 may be disposed on a surface of the circuit board 7000 that opposes its surface where the first driving coil 3332 and the first position sensor 3333 are disposed.

The first yoke 3334 may face the first driving magnet 3331 while having the first driving coil 3332 and the first position sensor 3333 interposed therebetween.

The first yoke 3334 may be a magnetic material, and may focus a magnetic force line generated in the first driving magnet 3331.

In addition, the first yoke 3334 may generate magnetic attraction in a direction in which the first yoke 3334 faces the first driving magnet 3331. Its details are to be described below.

A plurality of ball members (hereinafter, first ball group) 3410 and 3420 may be disposed between the rotation holder 3300 and the housing 1100 for the rotation holder 3300 to be rotated relative to the housing 1100 about the first axis (X-axis).

The first ball group 3410 and 3420 may separate the rotation holder 3300 and the housing 1100 from each other, and support the rotation of the rotation holder 3300 while being rotated in place or performing a rolling motion.

The first ball group 3410 and 3420 may include one rotation axis ball 3410 and two guide balls 3420. The number of the rotation axis balls 3410, or the guide balls 3420, as described in this specification, is only an example, and a different number of the rotation axis balls 3410 or the guide balls 3420 may be provided.

The rotation axis ball 3410 may provide a rotation axis of the rotation holder 3300. That is, the first axis (X-axis) may pass through the rotation axis ball 3410.

The axis rotation ball 3410 may be accommodated in a first accommodation groove 1120 formed in the housing 1100 and the second accommodation groove 3320 formed in the rotation holder 3300. The first accommodation groove 1120 and the second accommodation groove 3320 may face each other in the first axis direction (X-axis direction).

Each of the first accommodation groove 1120 and the second accommodation groove 3320 may have at least three inclined surfaces, and the rotation axis ball 3410 may be supported at three points or more in each of the first accommodation groove 1120 and the second accommodation groove 3320. Accordingly, the rotation axis ball 3410 may form the rotation axis of the rotation holder 3300 while being sandwiched in the first accommodation groove 1120 and the second accommodation groove 3320, and rotated in place.

The guide ball 3420 may be spaced apart from the rotation axis ball 3410.

The guide ball 3420 may be accommodated in a first guide groove 1130 formed in the housing 1100 and a second guide groove 3322 formed in the rotation holder 3300. The numbers of the first guide grooves 1130 and the second guide grooves 3322 may correspond to the number of the guide ball 3420, and the first guide groove 1130 and the second guide groove 3322 may face each other in the first axis direction (X-axis direction).

The first guide groove 1130 or the second guide groove 3322 may be formed in a curved or straight line extending centered on approximately the first axis (X-axis) in a circumferential direction.

The guide ball 3420 may be supported at two points in either the first guide groove 1130 or the second guide groove 3322, and may be supported at one point in the other one. For example, the guide ball 3420 may be supported at two points in the first guide groove 1130 and at one point in the second guide groove 3322 (or vice versa). Accordingly, the guide ball 3420 may support the rotation of the rotation holder 3300 while being accommodated in the first guide groove 1130 and the second guide groove 3322 and performing the rolling motion.

The folded module 3000 may include a second driving unit 3230 generating driving force to rotate the reflection holder 3200 about the second axis (Y-axis).

The second driving unit 3230 may be a voice coil motor, including a second driving magnet 3231 and a second driving coil 3232.

The second driving unit 3230 may be separately disposed in the reflection holder 3200 and the housing 1100. For example, the second driving magnet 3231 may be disposed on the reflection holder 3200, and the second driving coil 3232 may be disposed in the housing 1100 and face the second driving magnet 3231.

In an embodiment, the reflection holder 3200 may include an extension 3210 extending between the rotation holder 3300 and the housing 1100, and the second driving magnet 3231 may be disposed in the extension 3210 In addition, in an embodiment, the second driving coil 3232 may be mounted on the circuit board 7000 and disposed in the housing 1100.

The second driving magnet 3231 and the second driving coil 3232 may face each other in the optical axis direction (Z-axis direction).

The second driving magnet 3231 may have a surface facing the second driving coil 3232 and magnetized into the north (N) pole (or the south(S) pole), the neutral region, and the S pole (or the N pole) in the first axis direction (X-axis direction).

The second driving coil 3232 may include one or more coils, for example, two coils, facing the second driving magnet 3231.

The second driving magnet 3231 and the second driving coil 3232 may generate a driving force for rotating the reflection holder 3200 about the second axis (Y-axis) through electromagnetic interaction.

The second driving unit 3230 may include a second position sensor 3233. The second position sensor 3233 may detect a position of the second driving magnet 3231. One or more second position sensors 3233 may be provided.

The second position sensor 3233 may be mounted on the circuit board 7000 together with the second driving coil 3232, and disposed in the housing 1100. The second position sensor 3233 may face the neutral region of the second driving magnet 3231 when the folded module 3000 is in its neutral position.

The second position sensor 3233 may be the magnetic sensor. For example, the second position sensor 3233 may be the Hall sensor.

A second yoke 3234 may be disposed on a surface of the circuit board 7000 that opposes its surface where the second driving coil 3232 and the second position sensor 3233 are disposed.

The second yoke 3234 may face the second driving magnet 3231 while having the second driving coil 3232 and the second position sensor 3233 interposed therebetween.

The second yoke 3234 may be the magnetic material, and may focus a magnetic force line generated in the second driving magnet 3231.

A plurality of ball members (hereinafter, second ball group) 3430 may disposed between the reflection holder 3200 and the rotation holder 3300 for the reflection holder 3200 to be rotated relative to the rotation holder 3300 about the second axis (Y-axis).

The second ball group 3430 may separate the reflection holder 3200 and the rotation holder 3300 from each other, and may support the rotation of the reflection holder 3200 while being rotated in place.

The second ball group 3430 may include a plurality of ball members spaced apart from each other in the second axis direction (Y-axis direction). For example, the second ball group 3430 may include two ball members. The number of ball members 3430 described in this specification is only an example, and a different number of ball members 3430 may be provided.

The plurality of ball members 3430 may provide the rotation axis of the reflection holder 3200. That is, the second axis (Y-axis) may pass through the plurality of ball members 3430.

The plurality of ball members 3430 may be accommodated in a third accommodation groove 3310 formed in the rotation holder 3300 and a fourth accommodation groove 3220 formed in the reflection holder 3200. The number of the third accommodation grooves 3310 or the fourth accommodation grooves 3220 may correspond to the number of the plurality of ball members 3430, and the third accommodation groove 3310 and the fourth accommodation groove 3220 may face each other in the optical axis direction.

At least one of the third accommodation groove 3310 and the fourth accommodation groove 3220 may have three inclined surfaces, and the other may have at least two inclined surfaces. Accordingly, the plurality of ball members 3430 may be supported at three points in at least one of the third accommodation groove 3310 and the fourth accommodation groove 3220, and may be supported at two points in the other groove. The plurality of ball members 3430 may form the rotation axis of the reflection holder 3200 while being sandwiched in the third accommodation groove 3310 and the fourth accommodation groove 3320 and rotated in place, and some portions may simultaneously have freedom in one direction, thereby also overcoming a defect caused by tolerance.

Hereinafter, the description describes various embodiments of the first driving unit 3330 involved in the rotation of the rotation holder 3300 about the first axis (X-axis).

FIGS. 8 to 11 are views for explaining the first driving unit according to the embodiments of the present disclosure.

The first driving unit 3330 may include one or more first driving magnets 3331 and the plurality of first driving coils 3332. In the embodiments, the first driving magnet 3331 may include one or two magnets, and the first driving coil 3332 may include two coils.

Figure 8:
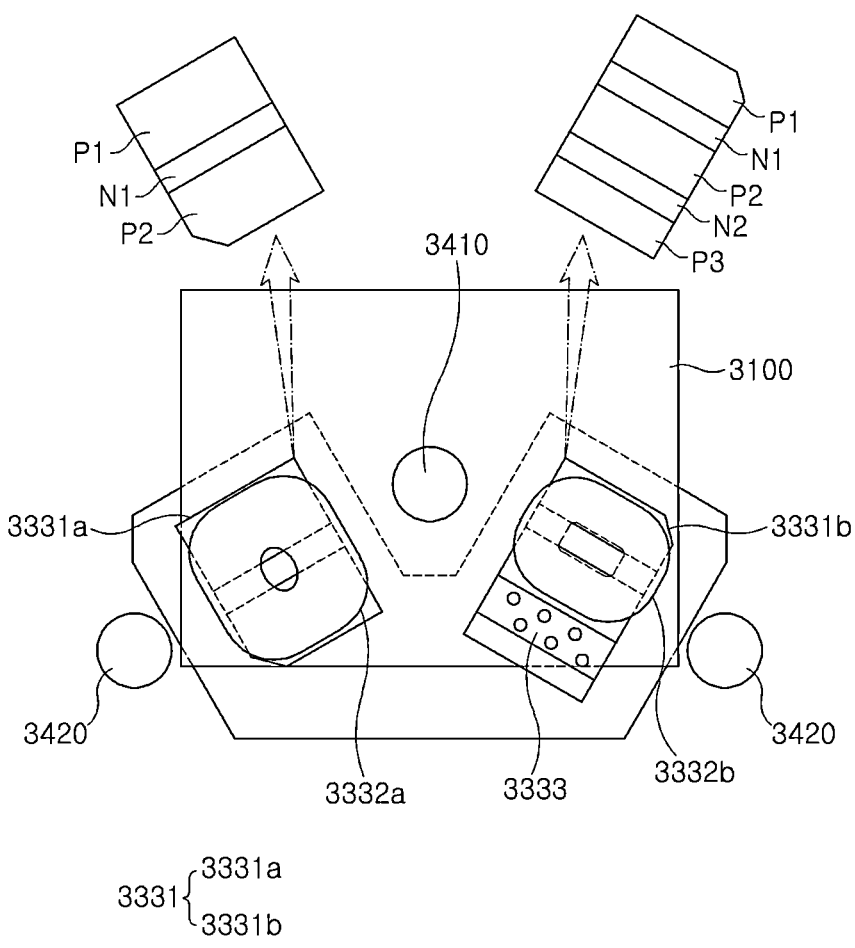
FIGS. 8 to 11 are views for explaining a first driving unit according to the embodiments of the present disclosure.

Referring to FIG. 8, the first driving magnet 3331 may include two magnets (hereinafter, first and second magnets) 3331a and 3331b, and the first driving coil 3332 may include two coils (hereinafter, first and second coils) 3332a and

3332b respectively facing these magnets. For example, the first magnet 3331a may face the first coil 3332a, and the second magnet 3331b may face the second coil 3332b.

The first driving magnet 3331 may be disposed in the first ball group 3410 and 3420. For example, the first magnet 3331a and the second magnet 3331b may be disposed in a space between the rotation axis ball 3410 and the guide ball 3420 while being spaced apart from each other. The first magnet 3331a and the second magnet 3331b may be spaced apart from each other in approximately the rotation direction of the rotation holder 3300.

The first magnet 3331a may have a surface facing the first coil 3332a and magnetized into a first polarity region P1, a neutral region N, and a second polarity region P2. The first polarity region P1 and the second polarity region P2 may have different polarities. For example, the first polarity region P1 may be the N pole (or the S pole), and the second polarity region P2 may be the S pole (or the N pole). The neutral region N may be their boundary region. The first polarity region P1, the neutral region N, and the second polarity region P2 may be disposed in a length direction of the first magnet 3331a.

The second magnet 3331b may have a surface facing the second coil 3332b and magnetized into the first polarity region P1, a first neutral region N1, the second polarity region P2, a second neutral region N2, and a third polarity region P3. The first polarity region P1 or the third polarity region P3 may have different polarity from the second polarity region P2. For example, the first polarity region P1 or the third polarity region P3 may be the N pole (or the S pole), and the second polarity region P2 may be the S pole (or the N pole). The first neutral region N1 or the second neutral region N2 may be their boundary region. The second magnet 3331b may be longer than the first magnet 3331a, and the first polarity region P1, the first neutral region N1, the second polarity region P2, the second neutral region N2, and the third polarity region P3 may be arranged in a length direction of the second magnet 3331b.

In addition, the second magnet 3331b may face the first position sensor 3333. In an embodiment, when the folded module 3000 is in its neutral position, the second coil 3332b may face the first polarity region P1, first neutral region N1, and second polarity region P2 of the second magnet 3331b, and the first position sensor 3333 may face the second neutral region N2 of the second magnet 3331b. The first position sensor 3333 may face the second polarity region P2 or the third polarity region P3 as the rotation holder 3300 is rotated about the first axis (X-axis), and may detect a change in a magnetic flux during this process, thereby measuring a movement amount of the rotation holder 3300.

That is, the first and second polarity regions P1 and P2 disposed on both sides of the first neutral region N1 may be used for driving force formation, and the second and third polarity regions P2 and P3 disposed on both sides of the second neutral region N2 may be used for position sensing. The second polarity region P2 may be used for both the driving force formation and the position sensing.

Figure 9:
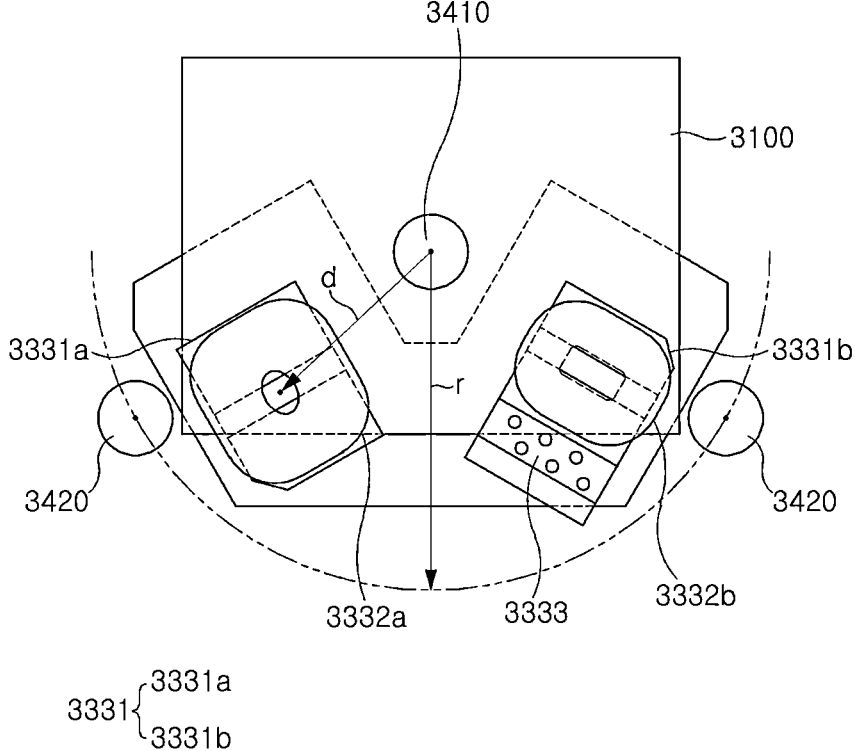

According to an embodiment shown in FIG. 9, the first driving magnet 3331 or the first driving coil 3332 may be disposed between the rotation axis ball 3410 and the guide ball 3420 and biased to the guide ball 3420. This structure may provide improved driving efficiency by disposing the center of the driving force for rotating the rotation holder 3300 far away from the first axis (X-axis), which is the rotation center.

In detail, the first driving unit 3330 may be disposed to satisfy $r/2<d<r$ where r indicates a radius of a circle passing through the two guide balls 3420 while using the first axis (X-axis) as the rotation center (or an approximate distance between the rotation axis ball 3410 and the guide ball 3420) and d indicates a distance between the first axis (X-axis) and the driving force center of the first driving unit 3330. If there are a plurality of driving force centers, the first driving unit 3330 may be disposed for the plurality of driving force centers to all satisfy the above-stated Expression.

Figure 10:
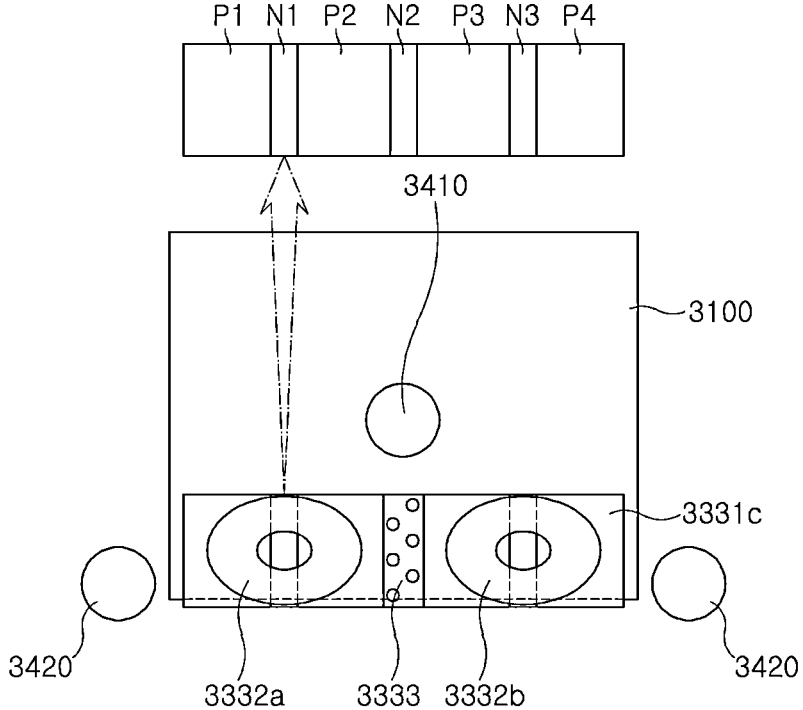

Referring to FIG. 10, the first driving magnet 3331 may include one magnet (hereinafter, a third magnet) 3331c, and the first driving coil 3332 may include the first coil 3332a and the second coil 3332b facing the third magnet 3331c.

The third magnet 3331c may be disposed in the space between the rotation axis ball 3410 and the guide ball 3420. In an embodiment, the third magnet 3331c may be disposed between the rotation axis ball 3410 and the guide ball 3420, and biased to the guide ball 3420 to have a portion disposed between two guide balls 3420.

The third magnet 3331c may have a surface facing the first coil 3332a and the second coil 3332b and magnetized into the first polarity region P1, the first neutral region N1, the second polarity region P2, the second neutral region N2, the third polarity region P3, a third neutral region N3, and a fourth polarity region P4. For example, the first polarity region P1 may be the N pole (or the S pole), the second polarity region P2 may be the S pole (or the N pole), the third polarity region P3 may be the N pole (or the S pole), and the fourth polarity region P4 may be the S pole (or the N pole). The first to third neutral regions N1, N2, and N3 may be their boundary regions. The polar and the neutral regions may be sequentially disposed in a length direction of the third magnet 3331c. In an embodiment, the length direction of the third magnet 3331c may be parallel to the second axis direction (Y-axis direction).

In addition, the third magnet 3331c may face the first position sensor 3333. The first position sensor 3333 may be disposed between the first coil 3332a and the second coil 3332b, and face the second neutral region N2. Accordingly, the second and third polarity regions P2 and P3 disposed on both the sides of the second neutral region N2 may be used for both the driving force formation and the position sensing.

Figure 11:
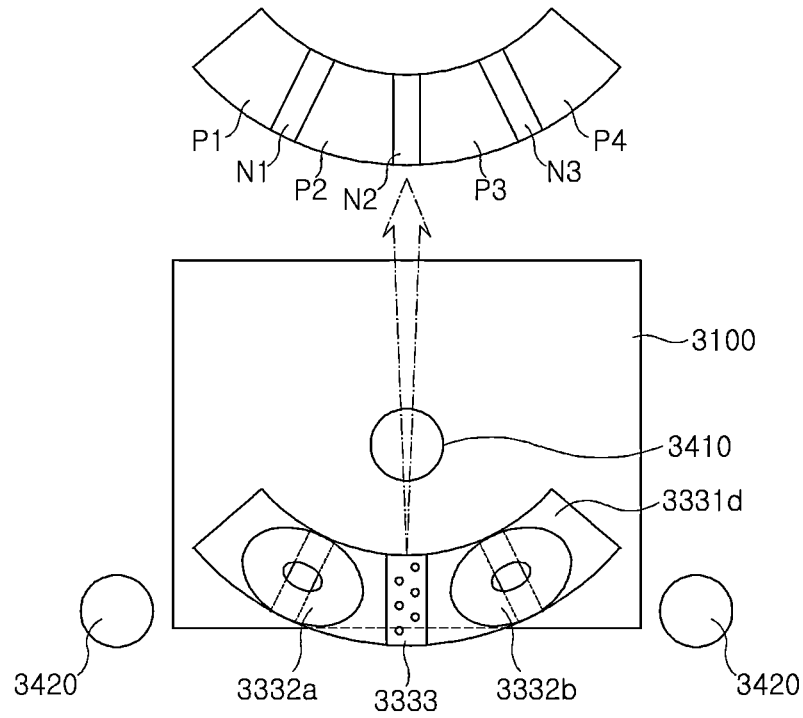

Referring to FIG. 11, the first driving magnet 3331 may include one magnet (hereinafter, fourth magnet) 3331d having an arc shape, and the first driving coil 3332 may include the first coil 3332a and the second coil 3332b facing the fourth magnet 3331d.

The fourth magnet 3331d may have the arc shape centered on the first axis (X-axis).

The third magnet 3331d may have a surface facing the first coil 3332a and the second coil 3332b and magnetized into the first polarity region P1, the first neutral region N1, the second polarity region P2, the second neutral region N2, the third polarity region P3, a third neutral region N3, and a fourth polarity region P4 in an arc direction.

The description omits the other descriptions of an embodiment shown in FIG. 11 and replaces the same with the descriptions of an embodiment of FIG. 10 described above.

Figure 12:
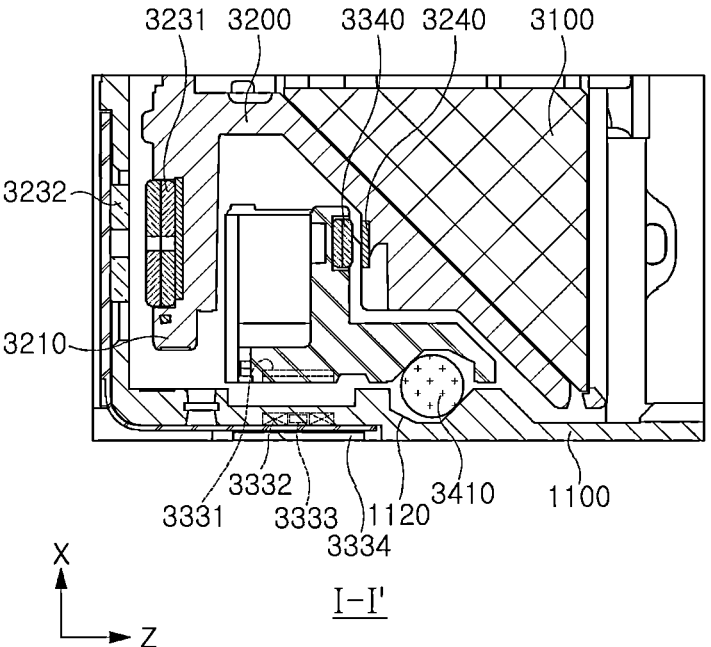
FIG. 12 is a cross-sectional view of portion I-I' of FIG. 5.

FIG. 12 is a cross-sectional view of portion I-I' of FIG. 5.

FIG. 12 shows a support structure of the folded module 3000 according to an embodiment of the present disclosure.

According to an embodiment of the present disclosure, the rotation holder 3300 may be supported by the housing 1100, and the reflection holder 3200 may be supported by the rotation holder 3300.

Referring to FIG. 12, the rotation holder 3300 may be supported by the housing 1100 in the first axis direction (X-axis direction). In an embodiment, the first driving magnet 3331 disposed on the rotation holder 3300 and the first yoke 3334 disposed on the housing 1100 may generate the magnetic attraction in the direction in which the first driving magnet 3331 and the first yoke 3334 face each other, that is, the first axis direction (X-axis direction). The rotation holder 3300 may be supported by the housing 1100 while having the first ball group 3410 and 3420 interposed therebetween in the first axis direction (X-axis direction) by means of the magnetic attraction formed by the first driving magnet 3331 and the first yoke 3334.

Meanwhile, the reflection holder 3200 may be supported by the rotation holder 3300 in the optical axis direction (Z-axis direction). The reflection holder 3200 and the rotation holder 3300 may include a pair of magnetic materials 3240 and 3340 disposed on their opposite surfaces in the optical axis direction (Z-axis direction).

The pair of magnetic materials 3240 and 3340 may be the first magnetic material 3240 disposed on the reflection holder 3200 and the second magnetic material 3340 disposed on the rotation holder 3300.

The first magnetic material 3240 or the second magnetic material 3340 may be either a pulling magnet or a pulling yoke. The first magnetic material 3240 and the second magnetic material 3340 may face each other in the optical axis direction (Z-axis direction), thereby generating the magnetic attraction in a direction in which the first magnetic material 3240 and the second magnetic material 3340 face each other. The reflection holder 3200 may be supported by the rotation holder 3300 while having the second ball group 3430 interposed therebetween in the optical axis direction (Z-axis direction) by means of the magnetic attraction formed by the first magnetic material 3240 and the second magnetic material 3340.

Figure 13:
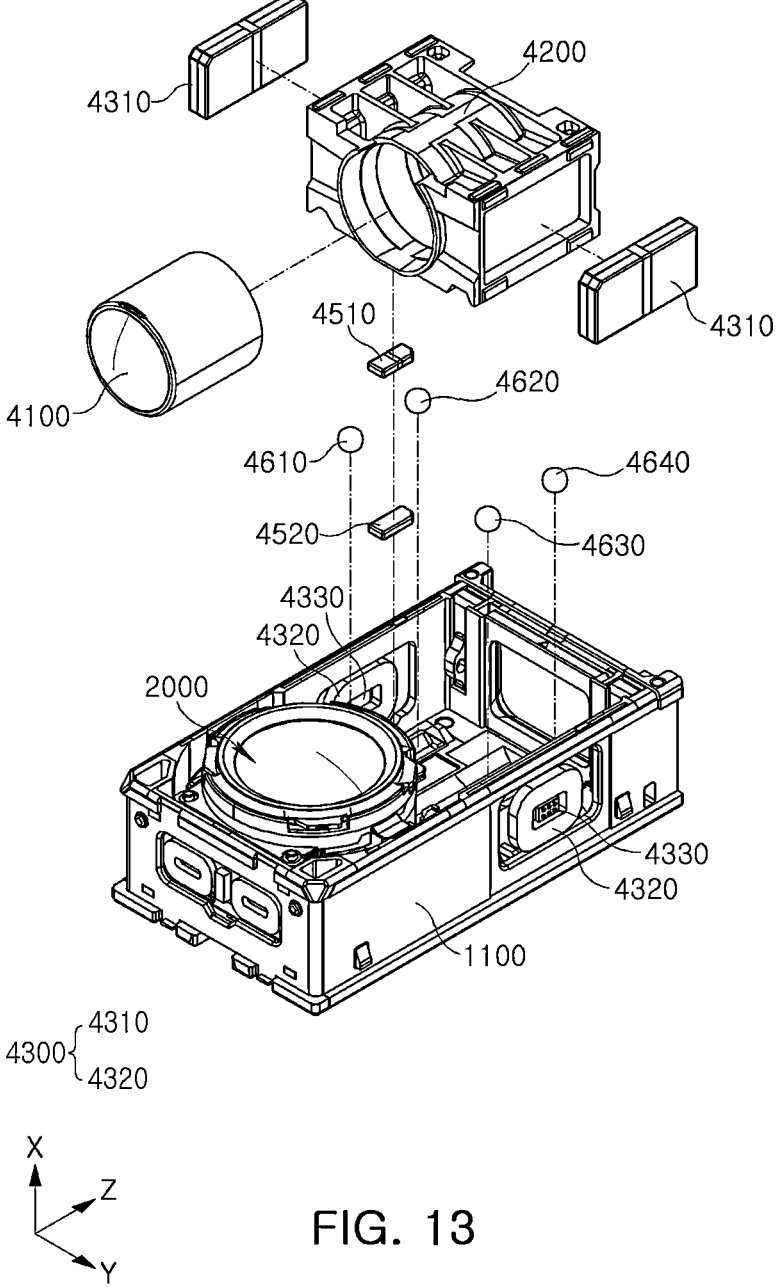
FIG. 13 is an exploded perspective view of a lens module according to an embodiment of the present disclosure.

FIG. 13 is an exploded perspective view of the lens module according to an embodiment of the present disclosure.

According to an embodiment of the present disclosure, the lens module 4000 may include a second lens barrel 4100 and a lens holder 4200. In addition, the housing 1100 may also be a component of the lens module 4000.

The second lens barrel 4100 may accommodate one or more lenses arranged along the optical axis, and the second lens barrel 4100 may be disposed in the lens holder 4200.

The lens holder 4200 may be supported by the housing 1100 to be movable in the optical axis direction. The second lens barrel 4100 may be accommodated in the lens holder 4200 and may be moved in the optical axis direction together with the lens holder 4200. In addition, one or more lenses may be moved in the optical axis direction together with the second lens barrel 4100 and the lens holder 4200.

That is, one or more lenses may be movable in the optical axis direction, and the autofocus function of the camera module 100 may be implemented by moving one or more lenses.

The lens module 4000 may include a third driving unit 4300 generating driving force to move the lens holder 4200 in the optical axis direction.

The third driving unit 4300 may be a voice coil motor, including a third driving magnet 4310 and a third driving coil 4320.

The third driving units 4300 may be separately disposed in the reflection holder 4200 and the housing 1100. For example, the third driving magnet 4310 may be disposed on one surface or each of two surfaces of the lens holder 4200, and the third driving coil 4320 may be disposed in the housing 1100 and face the third driving magnet 4310. In an embodiment, the third driving coil 4320 may be mounted on the circuit board 7000 and disposed in the housing 1100.

The third driving magnet 4310 and the third driving coil 4320 may face each other in the direction perpendicular to the optical axis, for example, the second axis (Y-axis).

The third driving magnet 4310 may have a surface facing the third driving coil 4320 and magnetized into the N pole (or the S pole), the neutral region, and the S pole (or the N pole) in the optical axis direction (Z-axis direction).

The third driving magnet 4310 and the third driving coil 4320 may use electromagnetic interaction to thus generate driving force for moving the lens holder 4200 in the optical axis direction.

The third driving unit 4300 may include a third position sensor 4330. The third position sensor 4330 may detect a position of the third driving magnet 4310 in the optical axis direction. One or more third position sensors 4330 may be provided.

The third position sensor 4330 may be mounted on the circuit board 7000 together with the third driving coil 4320, and disposed in the housing 1100. The third position sensor 4330 may face the neutral region of the third driving magnet 4310 when the lens module 4000 is in its initial position.

The third position sensor 4330 may be the magnetic sensor. For example, the third position sensor 4330 may be the Hall sensor.

A third yoke (not shown) may be disposed on a surface of the circuit board 7000 that opposes its surface where the third driving coil 4320 and the third position sensor 4330 are disposed.

The third yoke may face the third driving magnet 4310 while having the third driving coil 4320 and the third position sensor 4330 interposed therebetween.

The third yoke may be a magnetic material, and may focus a magnetic force line generated in the third driving magnet 4310.

Figure 14:
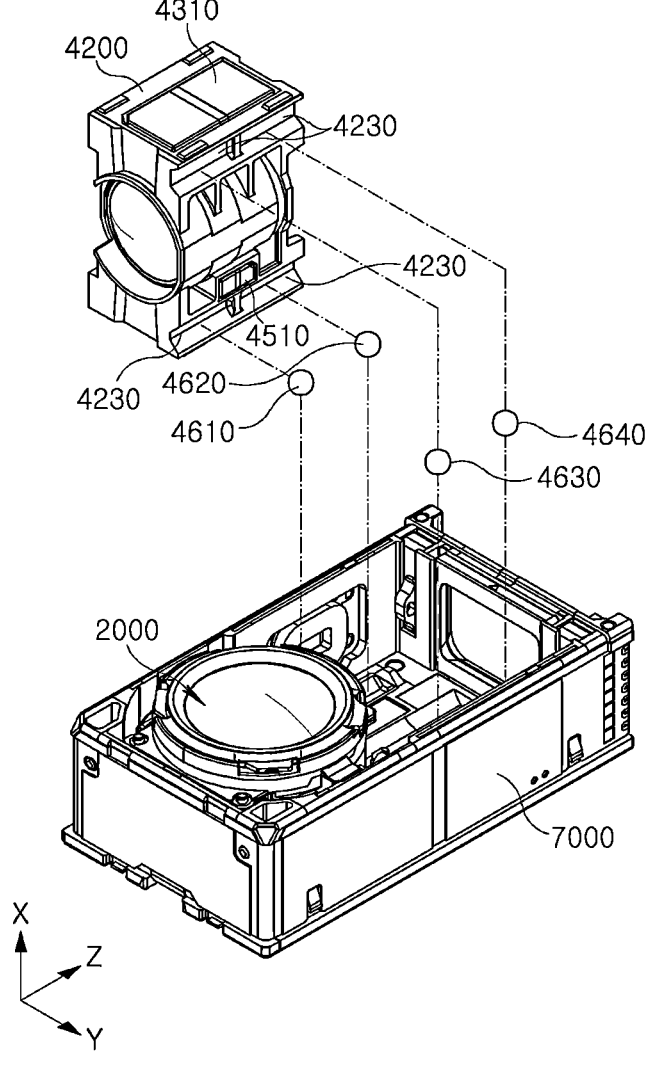
FIG. 14 is an exploded perspective view of the lens module, including the housing, according to an embodiment of the present disclosure.

FIG. 14 is an exploded perspective view of the lens module, including the housing, according to an embodiment of the present disclosure.

A third ball group 4600 (4610, 4620, 4630, 4640) may separate the lens holder 4200 and the housing 1100 from each other, and perform the rolling motion to support the movement of the lens holder 4200.

The third ball group 4600 may include at least three ball members. In an embodiment, the third ball group 4600 may include four ball members 4610, 4620, 4630, and 4640.

Among the four ball members 4610, 4620, 4630, and 4640, two ball members may support one side of the lens holder 4200, and the other two ball members may support the other side of the lens holder 4200. One side and the other side of the lens holder 4200 may oppose each other based on the optical axis.

Four ball members 4610, 4620, 4630, and 4640 may be accommodated in a third guide groove 1140 formed in the housing 1100 and a fourth guide groove 4230 formed in the lens holder 4200. The numbers of the third guide grooves 1140 and the fourth guide grooves 4230 may correspond to the number of the third ball group 4600, and the third guide groove 1140 and the fourth guide groove 4230 may face each other in the first axis direction (X-axis direction).

The third guide groove 1140 or the fourth guide groove 4230 may be formed in a straight line extending in approximate the optical axis direction.

Four ball members 4610, 4620, 4630, and 4640 may be supported at two points in at least some of the third guide groove 1140 and the fourth guide groove 4230, and may be supported at one point in the other of the grooves. Accordingly, four ball members 4610, 4620, 4630, and 4640 may perform the rolling motions while being accommodated in the third guide groove 1140 and the fourth guide groove 4230 to thus support the movement of the lens holder 4200.

The lens holder 4200 may be supported by the housing 1100 in the first axis direction (X-axis direction). The lens holder 4200 and the housing 1100 may include a pair of magnetic materials 4510 and 4520 disposed on their opposite surfaces in the first axis direction (X-axis direction).

The pair of magnetic materials 4510 and 4520 may be the third magnetic material 4510 disposed on the lens holder 4200 and the fourth magnetic material 4520 disposed on the housing 1100.

The third magnetic material 4510 or the fourth magnetic material 4520 may be either the pulling magnet or the pulling yoke. The third magnetic material 4510 and the fourth magnetic material 4520 may face each other in the first axis direction (X-axis direction), thereby generating the magnetic attraction in a direction in which the third magnetic material 4510 and the fourth magnetic material 4520 face each other. The lens holder 4200 may be supported by the housing 1100 in the first axis direction (X-axis direction) by means of the magnetic attraction formed by the third magnetic material 4510 and the fourth magnetic material 4520 while having four ball members 4610, 4620, 4630, and 4640 interposed therebetween, and moved in the optical axis direction (Z-axis direction).

To more stably support the movement of the lens holder 4200 in the optical axis direction (Z-axis direction), the third magnetic material 4510 disposed on the lens holder 4200 may be positioned in a square-shaped support region while having four ball members 4610, 4620, 4630, and 4640 as its vertices.

As set forth above, according to the embodiments of the present disclosure, the folded module may have the increased yaw rotation driving force and the camera module may thus have the improved optical image stabilization operation performance.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A folded module comprising:

a housing;

a rotation holder supported, together with a reflection member, on the housing to be rotatable about a first axis;

a first ball group, disposed between the housing and the rotation holder, comprising one rotation axis ball forming the first axis and two guide balls spaced apart from the rotation axis ball; and a first driving unit, comprising a first driving magnet and a first driving coil, configured to generate a driving force to rotate the rotation holder about the first axis, wherein the first driving magnet and the first driving coil are disposed in a space between the rotation axis ball and the two guide balls to be closer to the two guide balls than the rotation axis ball.

2. The folded module of claim 1, wherein the first driving coil comprises a first coil and a second coil that face the first driving magnet.

3. The folded module of claim 2, wherein the first driving magnet comprises:

a first magnet facing the first coil, and comprising two polarity regions on a surface that faces the first coil; and a second magnet facing the second coil, and comprising three polarity regions on a surface that faces the second coil.

4. The folded module of claim 3, wherein the first driving unit further comprises a first position sensor facing the second magnet.

5. The folded module of claim 2, wherein the first driving magnet, comprising a third magnet facing the first coil and the second coil, comprises four polarity regions on a surface that faces the first coil and the second coil.

6. The folded module of claim 5, wherein the third magnet comprises a first polarity region, a second polarity region, a third polarity region, and a fourth polarity region sequentially disposed in a length direction of the third magnet, the first coil faces the first polarity region and the second polarity region, and the second coil faces the third polarity region and the fourth polarity region.

7. The folded module of claim 5, wherein the first driving unit further comprises a first position sensor facing a third magnet, and the first position sensor is disposed between the first coil and the second coil.

8. The folded module of claim 1, wherein the first driving magnet is disposed on the rotation holder, and the first driving coil is disposed on the housing and faces the first driving magnet, and wherein the folded module further comprises a first yoke facing the first driving magnet while having the first driving coil interposed therebetween and generating magnetic attraction with the first driving magnet.

9. The folded module of claim 1, further comprising:

a reflection holder coupled with the reflection member, and supported on the rotation holder to be rotatable about a second axis perpendicular to the first axis;

a second ball group, disposed between the rotation holder and the reflection holder, forming the second axis; and a second driving unit, comprising a second driving magnet and a second driving coil, configured to generate a driving force to rotate the reflection holder about the second axis.

10. The folded module of claim 9, wherein the second driving magnet is disposed on the reflection holder, and the second driving coil, disposed on the housing, faces the second driving magnet.

11. The folded module of claim 10, further comprising:

a first magnetic material disposed on the reflection holder; and a second magnetic material, disposed on the rotation holder, facing the first magnetic material, wherein the first magnetic material and the second magnetic material generate magnetic attraction therebetween.

12. A camera module comprising:

a housing;

one or more lens modules, disposed in the housing, comprising at least one lens; and a folded module disposed in the housing, the folded module comprising:

a rotation holder supported, together with a reflection member configured to change an incident light path, on the housing to be rotatable about a first axis, a first ball group, disposed between the housing and the rotation holder, comprising one rotation axis ball forming the first axis and two guide balls spaced apart from the rotation axis ball, and a first driving unit, comprising a first driving magnet, a first driving coil, and a first position sensor, the first driving unit configured to generate a driving force to rotate the rotation holder about the first axis, wherein the first driving magnet comprises a magnet comprising three or more polarity regions and two or more neutral regions, respectively disposed between the polarity regions, and a subset of the two or more neutral regions in the magnet face the first driving coil, and a remainder of the two or more neutral regions face the first position sensor.

13. The camera module of claim 12, wherein the first driving magnet further comprises:

a first magnet comprising two polarity regions on a surface that faces the first driving coil; and a second magnet comprising three polarity regions on a surface that faces the first driving coil, and wherein the first driving coil comprises a first coil facing the first magnet and a second coil facing the second magnet.

14. The camera module of claim 12, wherein the first driving magnet further comprises a third magnet comprising four polarity regions on a surface that faces the first driving coil, and the first driving coil comprises a first coil and a second coil facing different polarity regions among the four polarity regions of the third magnet.

15. The camera module of claim 14, wherein the first position sensor is disposed between the first coil and the second coil.

16. The camera module of claim 12, wherein the folded module further comprises:

a reflection holder coupled to the reflection member, and supported on the rotation holder to be rotatable about a second axis perpendicular to the first axis;

a second ball group, disposed between the rotation holder and the reflection holder, forming the second axis; and a second driving unit, comprising a second driving magnet and a second driving coil, configured to generae a driving force to rotate the reflection holder about the second axis.

17. The camera module of claim 12, wherein the lens module comprises:

a first lens module disposed in front of the folded module based on an incident light path, and a second lens module disposed behind the folded module based on an incident light path.

* * * * *